(12) United States Patent
Eland et al.

(10) Patent No.: US 9,363,639 B2
(45) Date of Patent: Jun. 7, 2016

(54) SHARING CONTENT (71) Applicant: Google Inc., Mountain View, CA (US)

(72) Inventors: Andrew Eland, London (GB);
Benjamin Grol-Propkopczyk, San Francisco, CA (US)

(73) Assignee: Google Inc., Mountain View, CA (US)

( * ) Notice: Subject to any disclaimer, the term of this patent is extended or adjusted under 35 U.S.C. 154(b) by 129 days.

(21) Appl. No.: 13/658,164

(22) Filed: Oct. 23, 2012

(65) Prior Publication Data
US 2015/0156610 A1 Jun. 4, 2015

(51) Int. Cl.
*G06F 15/16* (2006.01)
*H04W 4/02* (2009.01)

(52) U.S. Cl.
CPC ................................. *H04W 4/023* (2013.01)

(58) Field of Classification Search
CPC ..................................................... H04W 4/023
USPC .......................... 709/204, 217, 220, 223, 238
See application file for complete search history.

(56) References Cited

U.S. PATENT DOCUMENTS

| 8,630,494 B1 * | 1/2014 | Svendsen ....................... 382/209 |
| 2009/0201896 A1 | 8/2009 | Davis et al. |
| 2010/0227594 A1 | 9/2010 | DeVries |
| 2011/0113119 A1 * | 5/2011 | Frazier et al. ................. 709/217 |
| 2011/0136502 A1 * | 6/2011 | Hubner et al. ............. 455/456.1 |
| 2011/0264743 A1 | 10/2011 | Baumert et al. |

* cited by examiner

*Primary Examiner* — Joseph E Avellino
*Assistant Examiner* — Marshall McLeod
(74) *Attorney, Agent, or Firm* — Dority & Manning, P.A.

(57) ABSTRACT

A system and method shares content with third parties based on the location of the third parties at the time the content was created. The third parties with which content is shared are selected by identifying those third parties which were within a zone of geographic proximity around the location at which the content was created at the time of its creation.

17 Claims, 5 Drawing Sheets

SHARING CONTENT

FIELD

The invention relates to sharing content based on location.

BACKGROUND

Generally, when it is desired to share content amongst a number of parties, the holder of the content selects the parties concerned and provides the parties with the content or with instructions regarding how to access it. For example, if the content is recorded in an electronic device such as a smartphone or a tablet computer, the third parties can be selected from a list of third parties on the electronic device. This process can however be both slow and prone to error.

SUMMARY

Embodiments of the invention described herein share content based on the geographical proximity of third parties to a content creation location at the time the content was created.

In embodiments, the content creation location is the location of a creator device used to create the content.

In embodiments, third parties selected for content sharing are restricted to those which were within a defined geographical area of proximity to the content creation location at the time the content was created.

In embodiments, a computer implemented method of sharing content comprises identifying a geographical location and time at which the content was created at a creator device; and in response to the content being created, sharing the content with third parties located within a defined zone of proximity around said geographical location at the time the content was created.

In embodiments, a computer implemented method of sharing content comprises identifying a geographical location and time at which the content was created; identifying a geographical location of each of one or more third party devices at said time; and sharing the content, based on which of said identified third party device locations are within a defined zone of proximity around said location at which the content was created.

In embodiments, a system for sharing content is configured to identify a geographical location and time at which the content was created at a creator device; and in response to the content being created, share the content with third parties located within a defined zone of proximity around said geographical location at the time the content was created.

In embodiments, a device for sharing content created at said device with third party devices is configured to cause a geographical location and time at which the content was created to be identified; cause a geographical location of each of one or more third party devices at said time to be identified; and cause the content to be shared with the third party devices, based on which of said identified third party device locations are within a defined zone of proximity around said location at which the content was created.

In embodiments, a system for sharing content is configured to identify a geographical location and time at which the content was created in a creator device; identify a geographical location of each of one or more third party devices at said time; and share the content, based on which of said identified third party device locations are within a defined zone of proximity around said location at which the content was created.

In embodiments, a computer program product for sharing content with third party devices comprises a computer readable storage medium storing computer executable code operable to cause a geographical location and time at which the content was created to be identified; cause a geographical location of each of one or more third party devices at said time to be identified; and cause the content to be shared, based on which of said identified third party device locations are within a defined zone of proximity around said location at which the content was created.

In embodiments an application program to be downloaded to a mobile communication device comprises computer implementable instructions for performing a method of sharing content comprising: identifying a geographical location and time at which the content was created at a creator device; and in response to the content being created, sharing the content with third parties located within a defined zone of proximity around said geographical location at the time the content was created.

In embodiments an application program to be downloaded to a mobile communication device comprises computer implementable instructions for performing a method of sharing content comprising: identifying a geographical location and time at which the content was created; identifying a geographical location of each of one or more third party devices at said time; and sharing the content, based on which of said identified third party device locations are within a defined zone of proximity around said location at which the content was created.

BRIEF DESCRIPTION OF THE DRAWINGS

In order that the invention may be more fully understood, embodiments thereof will now be described by way of illustrative example with reference to the accompanying drawings, in which.

DETAILED DESCRIPTION

Content is shared with third parties that, at the time the content was created, were within the vicinity of the geographical location at which the content was created.

The content comprises recorded information such as text content, pictorial content, including photographic content, and video content. The content is created in an electronic creator device such as a cellular telephone, tablet computer or PC. The geographical location of the electronic creator device is used to determine the location at which the content was created.

Third party users with whom the content is to be shared are determined by identifying all third party electronic devices, each of which is associated with a third party user, which were within a predefined proximity area around the location of the creator device at the time the content was created. The association between third party device and third party user may, for example, be established by determining the identity of the third party user whom was logged into the third party device at the time the content was created. Once the third parties have been identified, the content is shared automatically with the identified third parties. The content may be shared only with the identified third parties. For example, as explained more fully below, the content may be shared with all identified third party users via their associated third party devices.

There is no requirement for the creator of the content, for example the user of the creator device, to manually select which individual third parties the content should be shared with. For example, there is no requirement for individual third parties to be manually selected from a list displayed on the creator device. The third parties are instead selected automatically as all third parties who meet predefined proximity criteria. The third parties may be selected regardless of whether the creator of the content knew of the third parties previously and/or regardless of whether the creator of the content knew the third parties were in the vicinity at the time the content was created.

Figure 1:
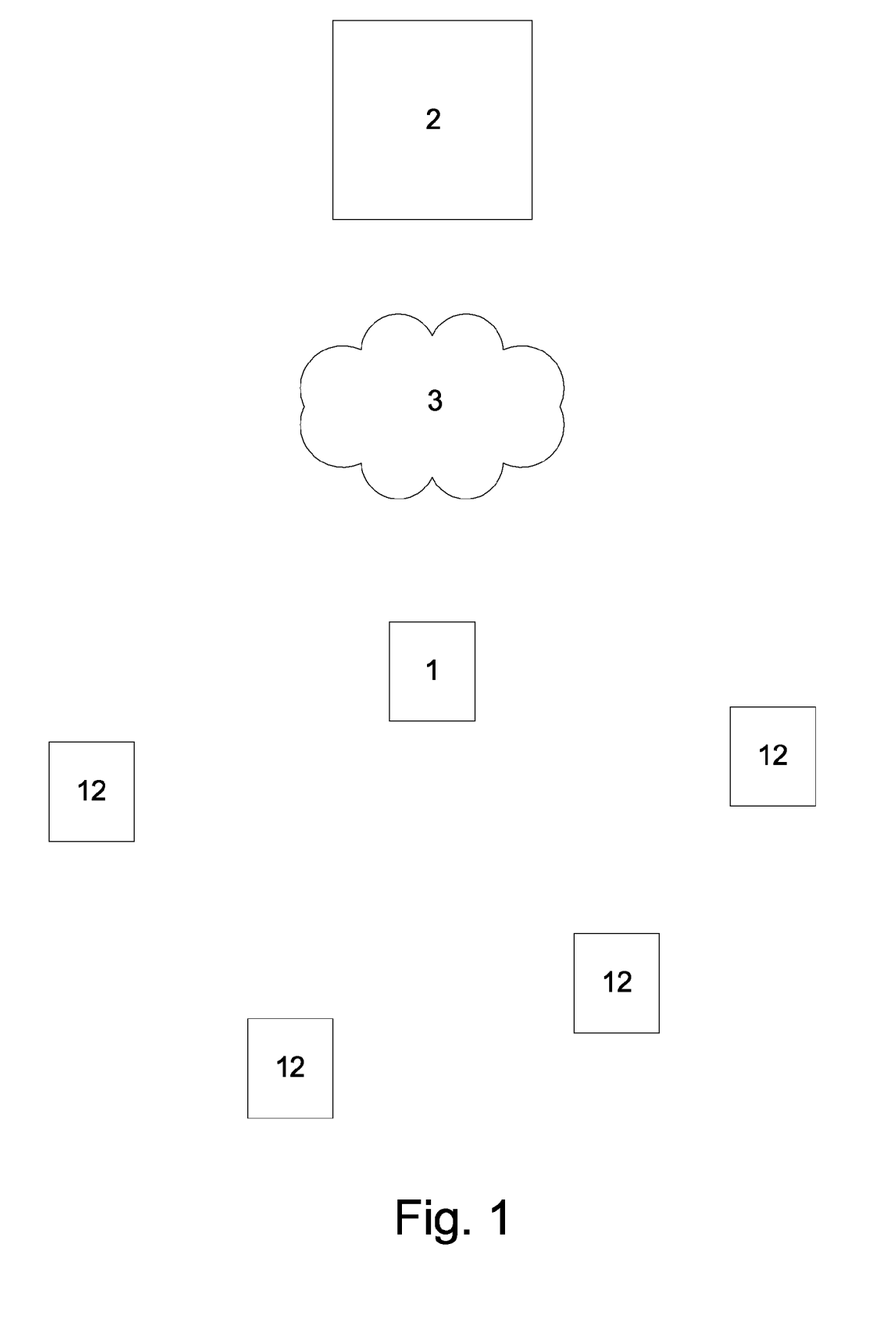
FIG. 1 is a schematic diagram of an electronic creator device, a server and a plurality of electronic third party devices configured to communicate over a communication network or through direct device-to-device communication methods.

FIG. 1 is a schematic diagram of a system comprising a creator device 1 and a server 2. The creator device 1 and the server 2 are configured to communicate over a network 3 such as the Internet. The creator device 1 is configured to record content created in the device 1 and to cause the content to be shared with one or more third parties. For example, as described further below, the device 1 may create content in response to receiving information through one or more inputs of the device 1 and share the content with third party user devices 12. The content can be shared either over the network 3, for example via the server 2, or by direct device-to-device communication methods such as Near Field Communication (NFC) and Bluetooth, as described further below.

Figure 2:
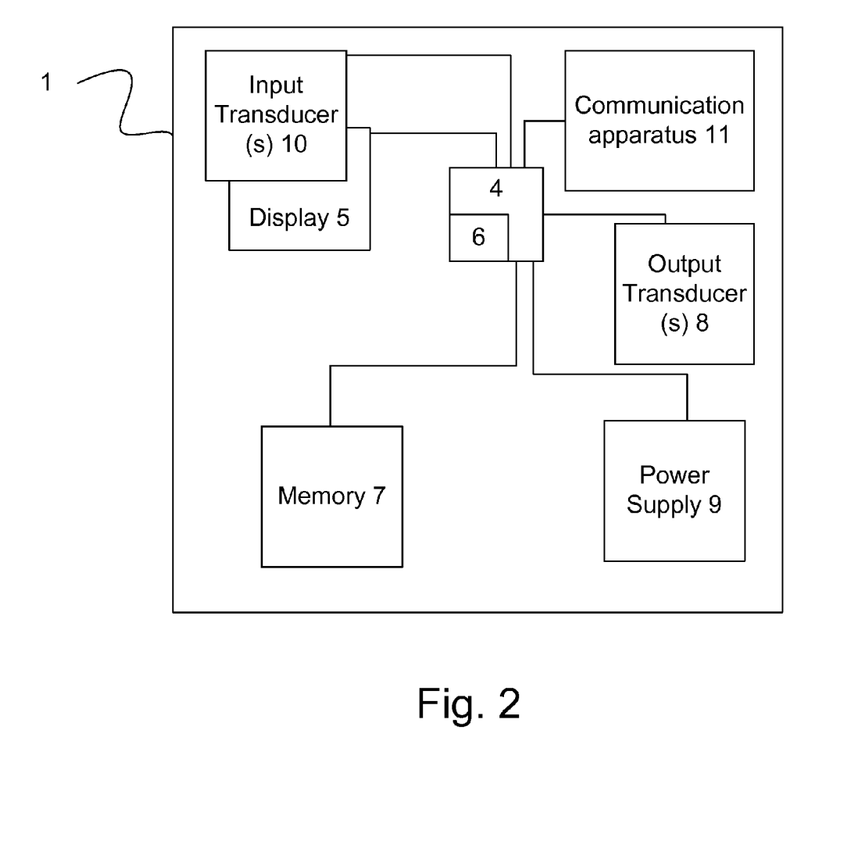
FIG. 2 is a schematic diagram of an electronic creator device.
Figure 3:
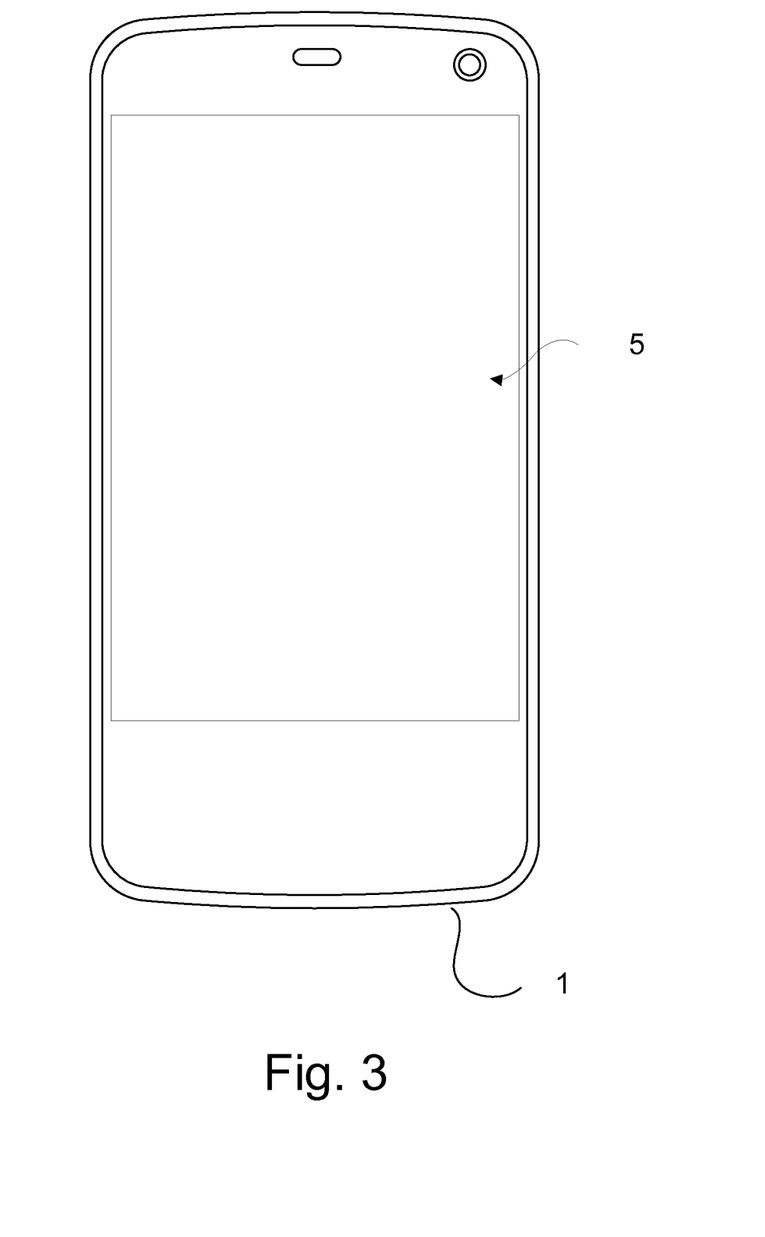
FIG. 3 is an illustration of an electronic creator device.

FIG. 2 is a simplified schematic of an electronic creator device 1. The creator device 1 may comprise a mobile (e.g. cellular) telephone terminal such as a smartphone as shown in FIG. 3. However, it will be appreciated that alternative creator devices 1 are equally possible. Examples of such devices 1 include tablet computers, laptop computers, personal digital assistants (PDAs), positioning devices such as GPS modules, and gaming consoles. Furthermore, although the creator device 1 shown in FIG. 2 is portable, the creator device 1 may alternatively be a non-portable device such as a desktop computer.

The creator device 1 comprises a controller 4, which is configured to control the output of a display panel 5 in the device 1. The controller 4 may include a processor 6, or a plurality of processors 6, which are configured to operate under the control of computer readable code optionally stored on a memory medium 7 such as ROM or RAM. In addition to the display panel 5, the controller 4 may be configured to control the output of one or more non-visual output transducers 8 for providing non-visual feedback to a user of the device 1. Examples of such non-visual output transducers 8 are a loudspeaker and a vibration module.

A power supply 9 is configured to supply power to the components of the device 1. An example power supply 9 comprises a suitable re-chargeable battery or fuel cell. The power supply 9 may be configured to electrically couple to a mains power supply either for re-charging or in order to supply the mains power directly to components of the device 1.

The creator device 1 also comprises communication apparatus 11 for sending and receiving data which may, for example, comprise content created in the device 1. The communication apparatus 11 comprises one or more antennas and transceiver circuitry for sending and receiving the data over the network 3 and/or for sending and receiving the data directly to/from third party devices 12 using device-to-device communication methods such as NFC or Bluetooth. Additionally, the communication apparatus 11 may comprise a GPS module for determining the geographical location of the creator device 1 using the Global Positioning System.

The creator device 1 may be configured to receive inputs via input transducers 10 of the device 1. The inputs may comprise user instructions upon which the device 1 is configured to create content, as explained below. An example of such an input transducer 10 is a touch sensitive input transducer 10 in the display screen 5. The touch sensitive input transducer 10 may comprise a touch-sensitive panel 10 overlaid on, or integrated into, the display screen 5 which is configured to supply signals indicative of tactile inputs incident on the screen 5 to the controller 4. The touch sensitive input transducer 10 is configured to generate and supply the signals to the controller 4 in response to detecting a tactile input at the screen 5.

Other examples of input transducers 10, which the creator device 1 may comprise in addition or as an alternative to the touch sensitive transducer 10, are one or more microphones, front or rear-facing cameras and depressible keys. As with the touch sensitive transducer 10, these input transducers 10 are configured to receive inputs and supply signals indicative of the inputs to the controller 4. The inputs may be provided by a user of the creator device 1.

The controller 4 may be configured to cause content to be created and recorded in the creator device 1 in response to, and on the basis of, the signals received from the input transducers 10. For example, the controller 4 may be configured to cause the display screen 5 to display content such as text, video, pictures or other images, colours and/or other graphical information based on, and in response to, tactile inputs at the display screen 5. The content may be recorded in the memory 7 of the creator device 1 as it is created.

In addition to causing the content itself to be recorded, the controller 4 is configured to cause the time at which the content was created to be recorded. For example, the controller 4 may be configured to cause time information such as the time of day, day of the week, month and year in which the content was recorded in the creator device 1 to be recorded. The time information may be recorded as a time-stamp which is associated with the recorded content. An example time-stamp takes the following format [hours: minutes: seconds: day: month: year]. The controller 4 may be configured to cause the time at which the content was created to be recorded in the memory 7 of the creator device 1.

The time at which the content was created can be determined as the time at which the content was first recorded in its entirety in the creator device 1. For example, if the content comprises a piece of text, the controller 4 may be configured to cause to be recorded the time at which the entirety of the text was first recorded in the device 1. Similarly, if the content comprises a picture, the controller 4 may be configured to cause to be recorded the time at which the entirety of the picture was first recorded in the device 1. If the content comprises a plurality of types of media, the controller 4 may be configured to cause to be recorded the time at which the latest piece of content was recorded in its entirety. For example, if the content comprises text and a picture, the controller 4 may be configured to cause to be recorded the later of the times at which the entirety of the text and the entirety of the picture were first recorded in the device 1.

Other options for determining the time at which the content was created are also possible, as discussed further below.

The controller 4 is also configured to cause the geographical location at which the content was created to be recorded. The geographical location at which the content was created can be determined by identifying the geographical location of the creator device 1 at the time at which the content was created. Identification of the geographical location of the creator device 1 may be carried out by any suitable means. For example, the location of the creator device 1 can be determined by aggregating the device location through a central server using GPS, Wifi or triangulation. As with the time of creation, the controller 4 may be configured to cause the geographical location at which the content was created to be recorded in the memory 7 of the creator device 1.

Once recorded, the controller 4 is configured to cause the content to be shared with selected third party users via their associated third party devices. The content may be shared automatically without input from the user of the creator device 1. The content may be shared either directly from the creator device 1 or from the creator device 1 via the server 2. The selection of the third party users is carried out by identifying all third party devices 12 which were within a defined proximity area around the creator device 1 at the time at which the content was created and establishing the third party users which are associated with each of the identified devices 12. This may involve determining the identity of the user that is logged in to each device 12, either at the creator device 1 or at the server 2.

In more detail, in response to content being created in the creator device 1, the controller 4 may be configured to immediately trigger a third party identification process in which all third party devices 12 which are within the defined geographical proximity area of the creator device 1 are identified. The geographical locations of third party devices 12 may be identified either directly by the creator device 1, for example using close range communication technologies such as NFC and Bluetooth, or by the server 2, for example by aggregating third party device locations.

Figure 4:
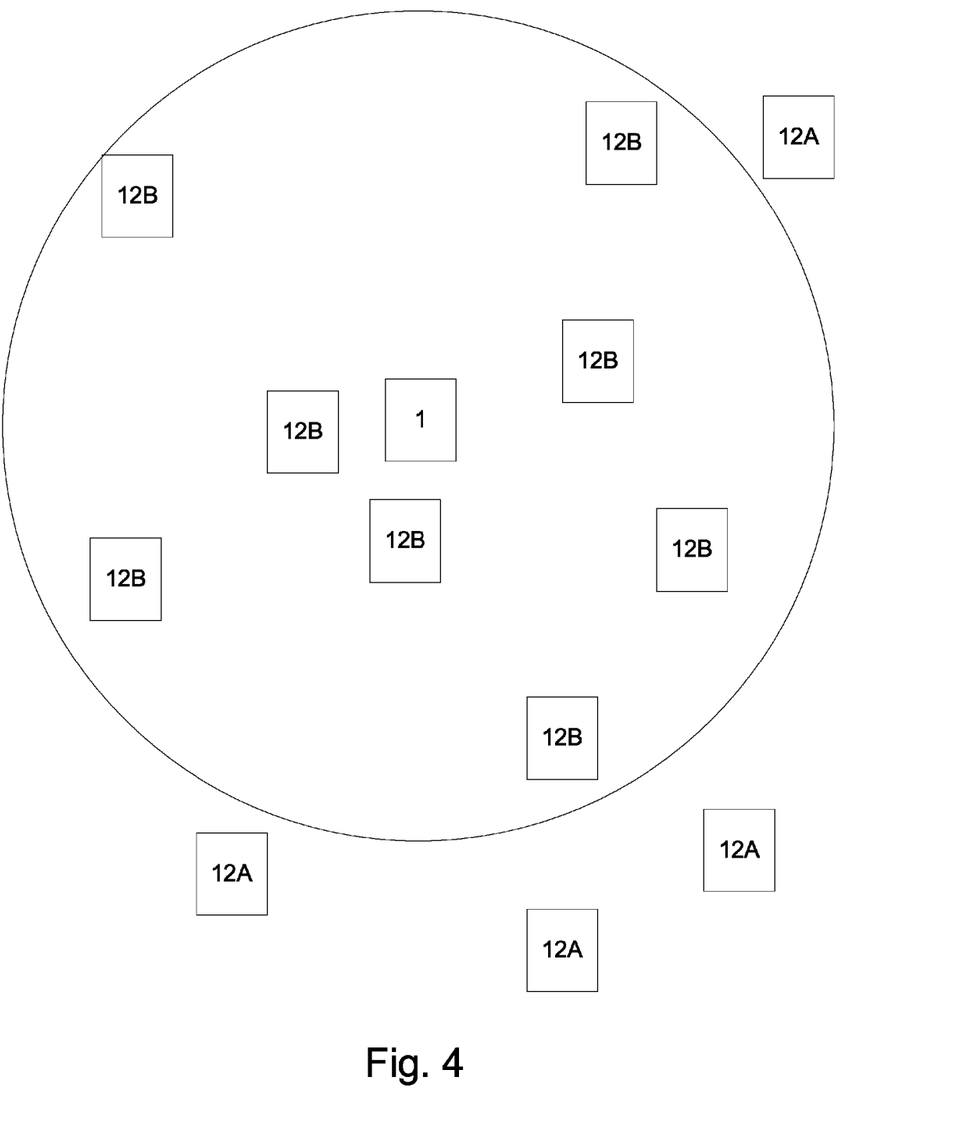
FIG. 4 is a schematic diagram of an electronic creator device, a geographical area of proximity around the creator device and third party electronic devices inside and outside of the area of proximity.

Referring to FIG. 4, the controller 4 may be configured to initiate a filter process in which the geographical location of each identified third party device 12 is checked to determine whether the third party device 12 was located within the defined proximity area around the creator device 1 at the time the content was created. The filter process may be carried out in the creator device 1 or in the server 2. The filter process comprises dismissing all third party devices 12A which have been identified but which were not within the defined proximity area at the time the content was created. Conversely, the third party devices 12B which were within the defined proximity area at the time the content was created are selected to be used as the basis of a content sharing operation. The identifications of these devices 12B may be stored in the memory 7 of the creator device 1 and/or may be transmitted to and/or stored in the server 2 for use in a third party user identification process which identifies the third party user associated with each third party device 12B.

The size and shape of the geographical area of proximity used in the filter process may be pre-stored in the memory 7 of the creator device 1 or the server 2. An example is a substantially circular area of a pre-defined radius which is centered on the geographical location of the creator device 1. Optionally, the controller 4 may cause one of a plurality of different stored proximity areas to be selected and applied in the filter process. For example, selection of the proximity area to be used in the filter process may depend on the type of the content which is to be shared. Alternatively, the size and/or shape of the proximity area used in the filter process may be determined dynamically, for example based on the number of identified third party devices 12 entering the filter process or on the geographical location at which the content was created.

The controller 4 is configured to cause the content to be shared with the identified third party users. For example, the controller 4 may be configured to cause the content to be shared with the third party devices 12B which have been identified as being within the defined proximity area around the creator device 1 at the time the content was created. The content may be communicated to the third party devices 12B using any suitable technique. For example, the content may be communicated to the third party devices 12B either directly from the creator device 1 using device-to-device communication methods, such as NFC and Bluetooth, or over a network 3 such as the Internet via the server 2 referred to above.

Alternatively, the controller 4 may cause a notification message to be sent to each third party device 12B which was identified as being within the defined proximity area around the creator device 1 at the time the content was created. The notification message may comprise instructions informing the user of the device 12B how to access the content should he or she wish to do so, for example by downloading the content from the server 2 over the Internet 3. The notification message may be communicated to the third party device 12B by any suitable means, such as SMS or e-mail.

Additionally or alternatively to sharing the content with the third party devices 12B identified in the filter process, the controller 4 may, as previously referred to, be configured to cause the identities of third party users associated with each third party device 12B to be determined and to share the content with other third party devices which are associated with those users. Such third party devices may, for example, comprise home or office desktop computers which may not have been within the defined proximity area around the creator device 1 at the time the content was created. The identities of the third party users may be determined either in the creator device 1 or in the server 2, for example, from a database which links user identities with electronic devices.

As previously explained, the sharing of content and/or notification of the availability of content may be carried out automatically in response to the content being created in the creator device 1.

An example of a method of sharing created content in accordance with the discussion above will now be described. The method comprises a sequence of steps which may be implemented by one or more computers, which may each comprise one or more processors such as that comprised in the controller 4 of the creator device 1, under the control of computer-readable instructions in a computer program such as an application for a smartphone or tablet computer. The method is described with respect to FIG. 5.

Figure 5:
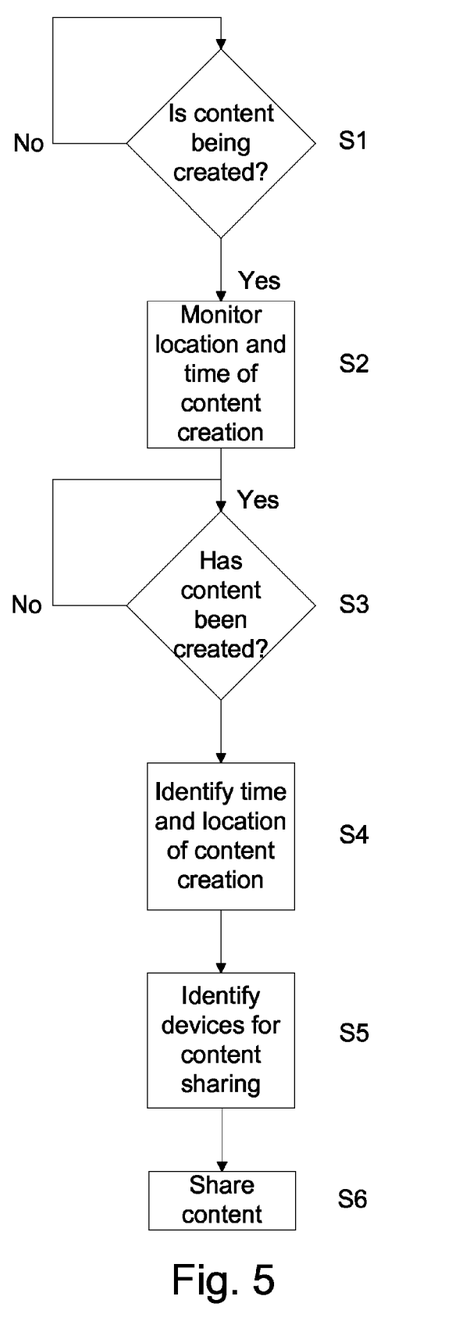
FIG. 5 is a flow diagram of a method of identifying third parties and sharing content with the identified third parties.

A first step S1 of the method comprises identifying that content is being created. This may comprise identifying that the creator device 1 is operating in a particular manner, for example by running a particular application program such as a program which allows text, drawings, photography or other types of content to be created using the creator device 1.

A second step S2 of the method comprises identifying the geographical location at which the content is being created, for example by identifying the geographical location of the creator device 1 during content creation. The geographical location of the creator device 1 may be monitored continuously throughout the period during which the content is being created. The second step S2 also comprises identifying the time at which the content is being created, for example using a time/date format as previously discussed. The start time and duration of the period in which the content is being created may both be identified.

A third step S3 of the method comprises identifying that the content has been created in its entirety and is thus ready to be shared. This may comprise monitoring the status of the application program referred to above so as to determine when the user of the creator device 1 chooses to end the period of content creation. An example is to detect that the user of the creator device 1 has exited the content creation program or has chosen to locally save the content to the memory 7 or upload the content to the server 2.

A fourth step S4 of the method comprises identifying the geographical location at which the content was created. As previously described, the geographical location may be identified at the location of the creator device 1 at the time the content was first recorded in its entirety at the creator device 1. However, the geographical location may alternatively be identified as the average geographical location of the creator device 1 during the period in which the content was being created, or the location in which creation of the content begun.

The fourth step S4 also comprises identifying the time at which the content was created. As previously described, this may be identified as the time at which the content was first recorded in its entirety in the creator device 1. However, the time of creation may alternatively be identified as another point during the period in which the content was being created, such as the mid point between the beginning and the end of the period in which the content was being created, or the beginning of the content creation period. The time may alternatively be identified as the entire period during which the content was being created.

A fifth step S5 of the method comprises selecting the third parties with which the content is to be shared by identifying third party devices 12B which were within a defined geographical zone around the creator device 1 at the time the content was created. For example, as described above, this may involve identifying all third party devices 12B which are within the defined geographical zone around the creator device 1 at an instantaneous time within the period of content creation, such as the instantaneous time at which the content is first recorded in its entirety. Alternatively, the geographical zone may be monitored for a longer duration within the period of content creation, such as the entire period, so that all third party devices 12 which were within the zone for any length of time during the period of content creation are selected as the basis for content sharing.

A sixth step S6 of the method comprises sharing the content based on the third party devices 12B which were selected for content sharing in the fifth step S5. The content can be shared by any suitable electronic communication method. As previously described, the content may be shared not just with the selected third party devices 12B but also with other third party devices which are associated with the users of the selected devices 12B.

In a particular example of the invention, the content may comprise a review of an item on a map, such as a restaurant, hotel, venue etc., which when posted in a maps application is automatically shared with all third parties who were in the vicinity of the location of the reviewed item at the time the review was created. Third parties which whom the content is shared may have the maps application installed in their user device.

The content may additionally or alternatively comprise minutes of a meeting or other content such as photos which were taken during a meeting or social event. When the content creator uploads the content to a social network (e.g. a server of the network), the content is automatically shared with all third party members of the network who were in the vicinity (e.g. the meeting room or event location) at the time the content was created. The creator of the content and the third parties with whom the content is shared may be automatically placed in a new sub-network within the social network.

It will be appreciated that the steps and operations described above can be performed or caused to be performed entirely by the controller 4 of the creator device 1, using the memory 7, by implementing computer implementable instructions stored in the memory 7. However, it will also be appreciated that one or more of the steps may alternatively be performed at the server 2, in particular the identification of third party device locations and the sharing of content with the third party devices.

Some portions of the above description present the features of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, the reference to these arrangements of operations in terms of modules should not be considered to imply a structural limitation and references to functional names is by way of illustration and does not infer a loss of generality.

Unless specifically stated otherwise as apparent from the description above, it is appreciated that throughout the description, discussions utilising terms such as "processing" or "identifying" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be understood that the process steps, instructions, of the invention as described and claimed, are executed by computer hardware operating under program control, and not mental steps performed by a human. Similarly, all of the types of data described and claimed are stored in a computer readable storage medium operated by a computer system, and are not simply disembodied abstract ideas.

The invention also relates to an apparatus for performing the operations herein. This apparatus may be specially constructed for the required purposes, or it may comprise a general-purpose computer selectively activated or reconfigured by a computer program stored on a computer readable medium that can be executed by the computer. Such a computer program is stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein can be executed by any type or brand computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the invention is not described with reference to any particular programming language. It is appreciated that a variety of programming languages may be used to implement the teachings of the invention as described herein.

The invention claimed is:

1. A computer Implemented method of sharing content comprising: receiving by a computing device, an indication of the creation of content;
   identifying, by the computing device, a geographical location and time at which the content was created;
   identifying, by the computing device, any third party devices instantaneously located within a defined zone of proximity around said geographic location at the time the content was created;
   dynamically adjusting, by the one or more computing devices, a size of the defined zone of proximity based on a number of the identified third party devices;
   in response to the content being created, automatically sharing, by the computing device, the content only with third party users associated with the third party devices identified as being located within the defined zone of proximity at the time the content was created regardless of whether any additional third party devices are present within the defined zone of proximity at the time at which the content is being shared.

2. A method according to claim 1, further comprising identifying a current location of at least one third party device at the time the content was created.

3. A method according to claim 2, wherein identifying any third party devices instantaneously located within the defined zone of proximity comprises determining whether the current location of the at least one third party device is within the defined zone of proximity.

4. A method according to claim 2, wherein a third party user is associated with the at least one third party device, further comprising sharing the content with at least one additional third party device associated with the at least one third party user, wherein the at least out additional third party device was located outside the defined zone of proximity at the time the content was created.

5. A method according to claim 1, wherein the content was created at a creator device, wherein automatically sharing the content comprises sharing the content with the identified third party devices directly from the creator device using a device-to-device communication method.

6. A method according to claim 1, wherein automatically sharing the content comprises comprising sharing the content over a communication network.

7. A system for sharing content, the system comprising: a computing device including one or more processors and associated memory, the memory storing instructions that, when implemented by the one or more processors, configure the computing device to: receive an indication of the creation of content;
   Identify a geographical location and time at which the content was created;
   identify any third party devices instantaneously located within a defined zone of proximity around said geographic location at the time the content was created;
   dynamically adjusting, by the one or more computing devices, a size of the defined zone of proximity based on a number of the identified third party devices;
   in response to the content being created, automatically share the content only with third party users associated with the third party devices identified as being located within the defined zone of proximity at the time the content was created regardless of whether any additional third party devices are present within the defined zone of proximity at the time at which the content is being shared.

8. The method according to claim 1, wherein the time at which the content was created corresponds to a time at which the content was first recorded in its entirety or a time contained within a time period along which the content was being created.

9. The method according to claim 1, wherein automatically sharing the content comprises transmitting the content directly to the identified third party devices or transmitting a notification message to the third party devices with instructions associated with accessing the content.

10. The system according to claim 7, wherein the time at which the content was created corresponds to a time at which the content was first recorded in its entirety or a time contained within a time period along which the content was being created.

11. The system according to claim 7, wherein the computing device is configured to automatically share the content by transmitting the content directly to the identified third party devices or by transmitting a notification message to the third party devices with instructions associated with accessing the content.

12. The system according to claim 7, wherein the computing device is configured to identify a current location of at least one third party device at the time the content was created and determine whether the current location of the at least one third party device is within the defined zone of proximity.

13. The system according to claim 12, wherein a third party user is associated with the at least one third party device, wherein the computing device is further configured to share the content with at least one additional third party device associated with the at least one third party user, wherein the at least one additional third party device was located outside the defined zone of proximity at the time the content was created.

14. A non-transitory computer-readable medium including instructions stored therein that, when executed by one or more processors, cause the one or more processors to perform operations, comprising: receiving an indication of the creation of content;
   identifying a geographical location and time at which the content was created;
   identifying any third party devices instantaneously located within a defined zone of proximity around said geographic location at the time the content was created;
   dynamically adjusting, by the one or more computing devices, a size of the defined zone of proximity based on a number of the identified third party devices;
   in response to the content being created, automatically sharing the content only with third party users associated with the third party devices identified as being located within the defined zone of proximity at the time the content was created regardless of whether any additional third party devices are present within the defined zone of proximity at the time at which the content is being shared.

15. The computer-readable medium according to claim 14, wherein the time at which the content was created corresponds to a time at which the content was first recorded in its entirety or a time contained within a time period along which the content was being created.

16. The computer-readable medium according to claim 14, wherein automatically sharing the content comprises transmitting the content directly to the identified third party devices or transmitting a notification message to the third party devices with instructions associated with accessing the content.

17. The computer-readable medium according to claim 14, further comprising identifying a current location of at least one third party device at the time the content was created, wherein identifying any third party devices instantaneously located within the defined zone of proximity comprises determining whether the current location of the at least one third party device is within the defined zone of proximity.

\* \* \* \* \*